(12) United States Patent
Matsuda

(10) Patent No.: US 7,537,081 B2
(45) Date of Patent: May 26, 2009

(54) POWER STEERING APPARATUS

(75) Inventor: Osamu Matsuda, Nara (JP)

(73) Assignee: JTEKT Corporation, Osaka (JP)

( * ) Notice: Subject to any disclaimer, the term of this patent is extended or adjusted under 35 U.S.C. 154(b) by 114 days.

(21) Appl. No.: 11/752,432

(22) Filed: May 23, 2007

(65) Prior Publication Data
US 2007/0289806 A1 Dec. 20, 2007

(30) Foreign Application Priority Data
May 26, 2006 (JP) ............................ 2006-147044

(51) Int. Cl.
*B62D 5/04* (2006.01)
(52) U.S. Cl. ...................... 180/444; 180/446
(58) Field of Classification Search ................ 180/444, 180/416, 410, 412, 428, 446
See application file for complete search history.

(56) References Cited
U.S. PATENT DOCUMENTS 5,014,801 A * 5/1991 Hirose ....................... 180/412
5,504,403 A * 4/1996 McLaughlin ................ 318/432
5,828,972 A * 10/1998 Asanuma et al. ............ 701/41

FOREIGN PATENT DOCUMENTS

| JP | 05-050924 A | 3/1993 |
| JP | 10-217983 A | 8/1998 |
| JP | 11-180332 A | 7/1999 |
| JP | 2002-331941 A | 11/2002 |
| JP | 2004-338562 A | 12/2004 |

\* cited by examiner

*Primary Examiner*—Paul N Dickson
*Assistant Examiner*—Levon Fiore
(74) *Attorney, Agent, or Firm*—Darby & Darby P.C.

(57) ABSTRACT

There is provided a power steering apparatus comprising a torque sensor detecting a steering torque capable of discriminating a normal input and an inverse input without a torsion bar. An intermediate gear engaging with rack teeth provided in an outer surface of a rack shaft and a pinion provided in a lower portion of a pinion shaft is interposed between both the rack tooth and the pinion. A force applied to the pinion shaft is detected by a first force sensor, a force applied to a support shaft of the intermediate gear is detected by a second force sensor, and a torque detection value capable of discriminating the normal input and inverse input is calculated by a torque calculating unit to which outputs of both the sensors are given.

5 Claims, 3 Drawing Sheets

POWER STEERING APPARATUS

CROSS-REFERENCE OF RELATED APPLICATION

This nonprovisional application claims priority under 35 U.S.C. 119(a) on Patent Application No. 2006-147044 in Japan on May 26, 2006, the entire contents of which are hereby incorporated by reference.

BACKGROUND

1. Technical Field

The present invention relates to a power steering apparatus structured such as to drive an actuator for assisting a steering in correspondence to an operation of a steering member such as a steering wheel or the like, and assist the steering on the basis of a generating force of the actuator.

2. Description of Related Art

As a power steering apparatus for a motor vehicle, there has been generalized a motor-driven power steering apparatus provided with an electric motor as an actuator for assisting a steering. The motor-driven power steering apparatus is structured such as to detect a steering torque applied to a steering member such as a steering wheel or the like by a torque sensor arranged in the middle of a steering shaft coupling the steering member and a steering mechanism, determine a target assisting force on the basis of a direction and a magnitude of the detected steering torque, and control so as to drive a motor for assisting the steering for generating the target assisting force (for example, refer to Japanese Patent Application Laid-Open No. 2004-338562).

Further, in recent years, even in a hydraulic power steering apparatus provided with a reciprocating type hydraulic cylinder (power cylinder) arranged in the steering mechanism as the actuator for assisting the steering, there has been proposed a hydraulic power steering apparatus structured such as to detect a steering torque applied to the steering member by a torque sensor, control a hydraulic control valve supplying and discharging a operating fluid to and from the power cylinder on the basis of the result of detection, and correspond to a change of an assisting force characteristic in correspondence to a traveling state such as a vehicle speed, a yaw rate and the like (for example, refer to Japanese Patent Application Laid-Open No. 11-180332).

The torque sensor used in the power steering apparatus as mentioned above is generally structured such as to divide the steering shaft forming a detected subject into a first shaft in a side of the steering member and a second shaft in a side of the steering mechanism, coaxially couple them by a torsion bar having a small diameter, and detect the steering torque applied to the steering shaft on the basis of the operation of the steering member via a relative angular displacement generated between the first and second shafts in connection with a torsion of a torsion bar.

SUMMARY

However, in this kind of power steering apparatus provided with the torque sensor, there is generated a time delay required for the torsion of the torsion bar during a period till the detection of the steering torque is executed after the operation of the steering member is executed and, for example, a response of the steering assisting force is delayed at a time of starting the steering or at a time of turn-back steering from one direction to the other direction, and there is a problem that a reduction of a steering feeling is caused.

On the other hand, during the traveling of the vehicle, a reaction force from a road surface is transmitted to the steering shaft via the steering mechanism, and is felt as a so-called "inverse input" for a driver operating the steering member. The inverse input is useful for transmitting the state of the road surface during the traveling to the driver and keeping a steering feeling good, except a case that the inverse input is too large, however, in the power steering apparatus provided with the torque sensor mentioned above, the torsion bar is twisted also at a time when the inverse input is applied, the torque detection is executed absolutely in the same manner as the time when the steering torque is applied as a normal input, a force in a direction of canceling the inverse input is applied on the basis of an operation of the steering actuator in correspondence to the torque detection, the inverse input is excluded unconditionally, and there is generated a problem that the state of the road surface is hard to be transmitted to the driver.

An object is to provide a power steering apparatus which is provided with a torque sensor which can detect a steering torque by enabling to discriminate a normal input and an inverse input without using a torsion bar, and prevents a delay of a torque detection and an idle exclusion of the inverse input, whereby a good steering feeling is obtained.

There is provided a power steering apparatus equipped in a vehicle provided with a rack and pinion type steering mechanism converting a rotation of a pinion shaft in response to an operation of a steering member into a displacement in an axial direction of a rack shaft to execute steering, comprising:

a torque detector detecting a steering torque applied to said steering member;

a steering actuator operating based on said torque detected by said torque detector and applying a steering assisting force to said rack shaft; and an intermediate gear engaging with a pinion provided in said pinion shaft and rack teeth provided in said rack shaft, and transmitting the rotation of said pinion shaft to said rack shaft, wherein said torque detector includes:

a first force sensor detecting a force applied to said pinion shaft;

a second force sensor detecting a force applied to a support shaft of said intermediate gear; and a torque calculating unit calculating said torque based on a difference of the forces detected by said first force sensor and the second force sensor.

Since the intermediate gear engaging with both of the pinion shaft and the rack shaft is provided in the transmission system transmitting the rotation of the pinion shaft to the rack shaft, the forces applied to the support shaft of the intermediate gear and the pinion shaft are respectively detected by the first and second force sensors, the steering torque is computed by using the difference of the detected forces, it is possible to detect the steering torque without using the torsion bar, and it is possible to achieve an operation feeling having a good response while excluding the delay caused by the torsion of the torsion bar.

Further, since the difference of the detected forces by the first and second force sensors becomes positive and negative in correspondence to the direction of the transmission between the pinion shaft and the intermediate gear, excellent effects are achieved such as it is possible to discriminate the normal input and the inverse input, it is possible to feed back to the steering member without excluding the necessary inverse input, it is possible to achieve a good steering feeling by accurately making the driver feel the state of the road surface, and the like.

DETAILED DESCRIPTION

Figure 1:
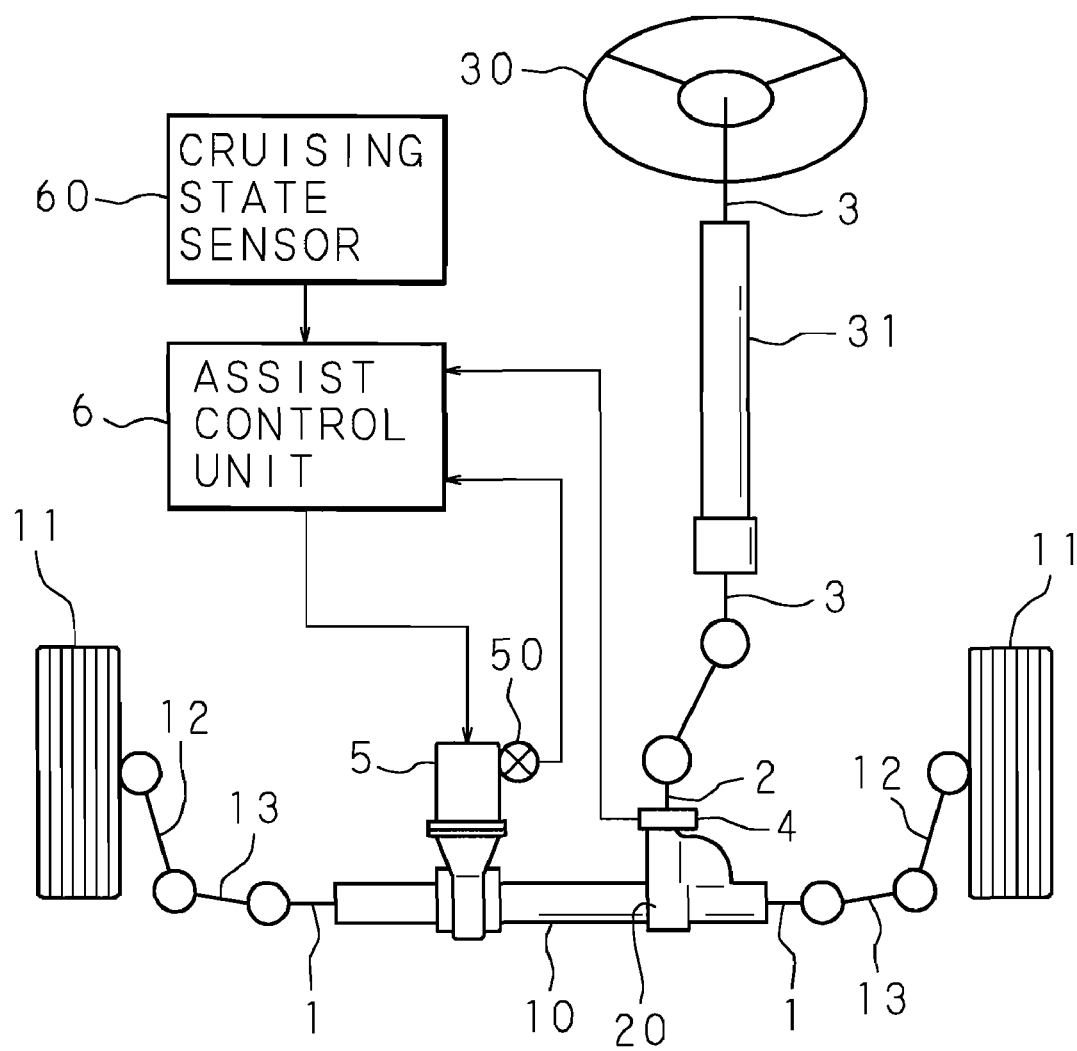
FIG. 1 is a schematic view showing a structure of a power steering apparatus of an embodiment.

A description will be in detail given below on the basis of the accompanying drawings showing embodiments. FIG. 1 is a schematic view showing a structure of a power steering apparatus of an embodiment. In this case, this drawing exemplifies a motor-driven power steering apparatus provided with an electric motor as an actuator for assisting a steering, however, the present invention can be structured as a hydraulic power steering apparatus having a reciprocating type hydraulic cylinder as a steering actuator.

The power steering apparatus of an embodiment is provided with a rack and pinion type steering mechanism having a rack shaft 1 supported to an inner portion of a rack housing 10 extended in a lateral direction of a vehicle body so as to be movable in a direction of an axial length, and a pinion shaft 2 rotatably supported to an inner portion of a pinion housing 20 crossing in the middle of the rack housing 10.

Both ends of the rack shaft 1 are protruded to an outer portion from both sides of the rack housing 10, and are coupled to knuckle arms 12 and 12 of right and left front wheels 11 and 11 serving as wheels for steering via independent tie rods 13 and 13, whereby the structure is made such that a movement of the rack shaft 1 in the direction of the axial length generated within the rack housing 10 is transmitted to the knuckle arms 12 and 12 of the right and left front wheels 11 and 11 via the tie rods 13 and 13 in both ends, and the right and left front wheels 11 and 11 are steered by pushing and pulling the knuckle arms 12 and 12.

An upper end of the pinion shaft 2 is protruded to an outer side of the pinion housing 20, and is coupled to a lower end of the steering shaft 3 facing to an upper position. The steering shaft 3 is rotatably supported to an inner portion of a tubular column housing 31, and is supported to an inner portion of a vehicle chamber (not shown) via the column housing 31 while keeping an inclined posture in which a front side comes to a lower side. Both ends of the steering shaft 3 are protruded to an outer portion from both upper and lower sides of the column housing 31, the pinion shaft 2 is coupled to a downward protruding end as mentioned above, and a steering wheel 30 serving as the steering member is fixedly provided in an upward protruding end.

Figure 2:
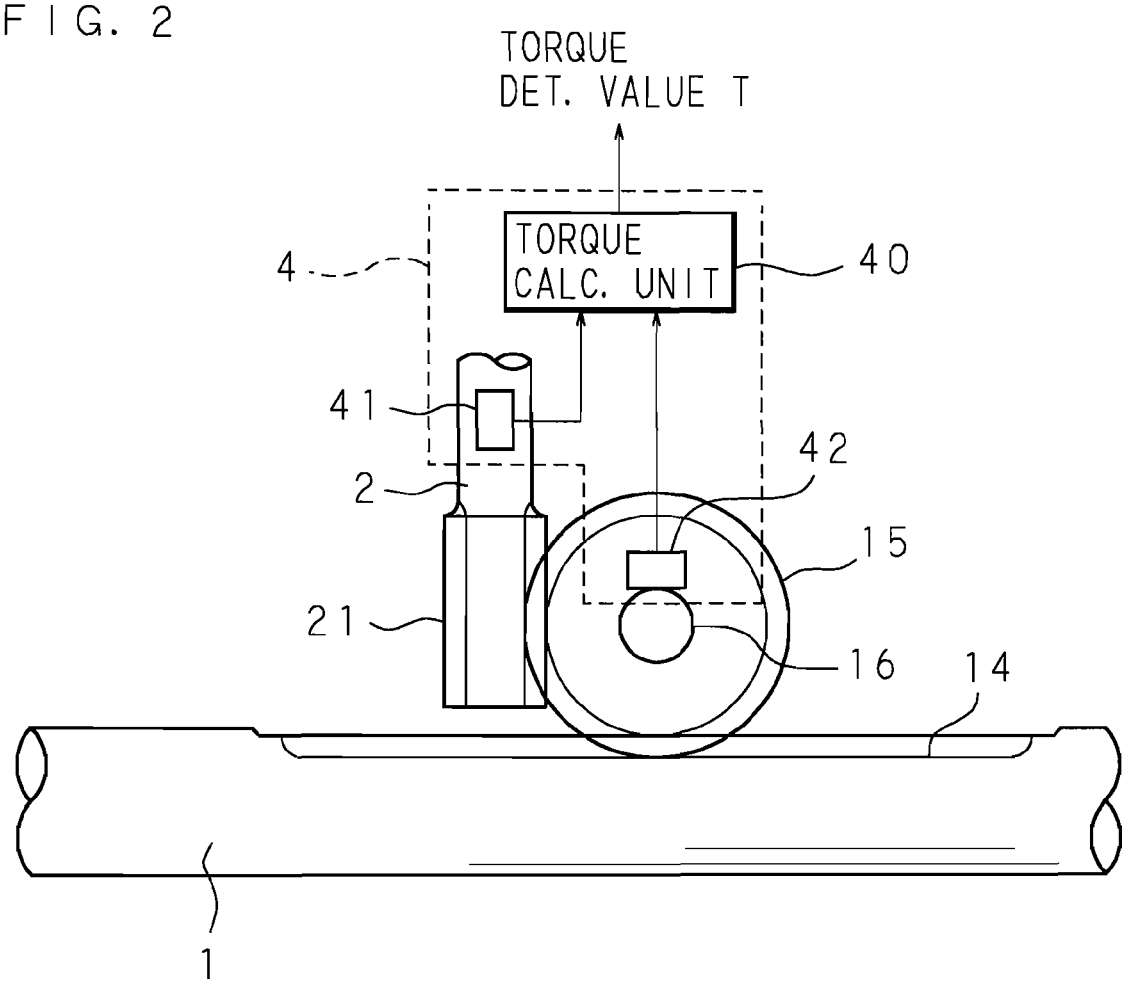
FIG. 2 is an explanatory view briefly showing a structure of a transmission means from a pinion shaft to a rack shaft.

On the other hand, a lower end of the pinion shaft 2 extending to an inner portion of the pinion housing 20 is coupled to the rack shaft 1 via a transmission means shown in FIG. 2 in a crossing portion to the rack housing 10. FIG. 2 is an explanatory view briefly showing a structure of the transmission means from the pinion shaft 2 to the rack shaft 1.

As illustrated, the lower end of the pinion shaft 2 is extended close to the rack shaft 1, and a pinion 21 provided with a worm tooth in an outer periphery is integrally formed in a lower half portion of the pinion shaft 2. Further, a rack tooth 14 is formed in a facing portion to the lower end of the pinion shaft 2, in an outer periphery of the rack shaft 1 over a suitable length in a direction of an axial length. As mentioned above, the rack tooth 14 formed on the outer surface of the rack shaft 1 and the worm tooth in the outer periphery of the pinion 21 are respectively engaged with an intermediate gear 15 supported rotatably around a support shaft 16 which is orthogonal to each of the rack shaft 1 and the pinion shaft 2, at different positions in a circumferential direction.

In accordance with the structure mentioned above, in the case that the steering wheel 30 is rotationally operated for steering, the rotation is transmitted to the pinion shaft 2 via the steering shaft 3, and the pinion shaft 2 is rotated around an axis. In the case that the pinion shaft 2 is rotated, the intermediate gear 15 engaging with the pinion 21 provided in the lower half portion is rotated, the rotation is motion converted in the engagement portion with the rack shaft 14, and the rack shaft 1 is moved in the direction of the axial length. On the basis of this movement, as mentioned above, the knuckle arms 12 and 12 are pushed and pulled via the tie rods 13 and 13 in both ends, and the right and left front wheels 11 and 11 provided with the knuckle arms 12 and 12 are steered.

The power steering apparatus of the embodiment is provided with a torque detection apparatus 4 having a characteristic structure shown below, for detecting a steering torque applied to the steering wheel 30 serving as the steering member at a time of the steering executed as mentioned above, and is provided with a motor 5 for assisting the steering which is controlled so as to be driven on the basis of the detected torque by the torque detection apparatus 4 and applies a steering assisting force to the steering mechanism.

As shown in FIG. 1, the torque detection apparatus 4 is provided in an inner portion of the pinion housing 20 supporting the pinion shaft 2, and is provided with a first force sensor 41 attached to the pinion shaft 2, a second force sensor 42 attached to the support shaft 16 of the intermediate gear 15, and a torque calculating unit 40 computing a steering torque from outputs of the first and second force sensors 41 and 42, as shown in FIG. 2.

The first and second force sensors 41 and 42 are sensors for detecting forces applied to the pinion shaft 2 and the support shaft 16 of the intermediate gear 15 to which the first and second forces sensors 41 and 42 are respectively attached, and can be structured, for example, as a sensor detecting a reaction force applied to a bearing (not shown) supporting the pinion shaft 2 and the support shaft 16. The torque calculating unit 40 is structured as a computation processing portion which determines a difference between both the outputs by subtracting the output of the second force sensor 42 from the output of the first force sensor 41, and outputting a torque detection value T obtained by multiplying the difference by a predetermined gain.

The output of the first force sensor 41 corresponds to a magnitude of the force applied to the pinion shaft 2, and the output of the second force sensor 42 corresponds to a magnitude of the force applied to the support shaft 16 of the intermediate gear 15. During the steering executed as mentioned above, the rotation of the pinion shaft 2 is transmitted to the rack shaft 1 via the pinion 21 and the intermediate gear 15. At a time when the force mentioned above is applied, that is, at a time when the normal input is applied, in the case of comparing the force applied to the pinion shaft 2 with the force applied to the support shaft 16, the former is always larger than the latter at a transmission efficiency degree between the pinion 21 and the intermediate gear 15.

On the other hand, in the case that a reaction force is applied from a road surface to the front wheels 11 and 11 during the traveling of the vehicle, the reaction force is transmitted to the rack shaft 1, the rack shaft 1 is pushed in the direction of the axial length, and the pressing force is transmitted to the pinion shaft 2 via the intermediate gear 15 engaging with the rack tooth 14. At a time when the force is applied as mentioned above, that is, at a time when an inverse input is applied, in the case of comparing the force applied to the pinion shaft 2 with the force applied to the support shaft 16, the former is always smaller than the latter at the transmission efficiency degree between the pinion 21 and the intermediate gear 15.

Accordingly, a torque detection value T output from the torque calculating unit 40 as a result of the computation mentioned above comes to a positive value at a time when the normal input is applied, and comes to a negative value at a time when the inverse input is applied. Therefore, the torque detection value T given as the positive value corresponds to a magnitude of the steering torque applied to the steering wheel 30 for steering, and the torque detection value T given as the negative value corresponds to a magnitude of the inverse input applied to the steering mechanism on the basis of the application of the road surface reaction force during the traveling.

The worm pinion provided with the worm tooth in the outer periphery is used as the pinion 21 integrally rotating with the pinion shaft 2, because the transmission efficiency between this kind of pinion 21 and the intermediate gear 15 is low, it is possible to enlarge the output difference between the first and second force sensors 41 and 42, and it is possible to increase a precision of the torque detection value T calculated by using the output difference. However, it is possible to employ a pinion 21 structured as a spur gear of a spur tooth or a bevel tooth.

The motor 5 for assisting the steering is attached to an outer side of a middle portion of the rack housing 10 spaced from the connection portion of the pinion housing 20 in such a manner that a shaft center is approximately orthogonal thereto. An output end of the motor 5 extending to an inner portion of the column housing 31 is structured, for example, such that a pinion firmly attached to the output end is engaged with a rack tooth provided at the corresponding position of the rack shaft 1, thereby motion converting the rotation of the motor 5 so as to transmit to the rack shaft 1, and assisting the steering executed as mentioned above by adding the moving force in the direction of the axial length to the rack shaft 1. In this case, the rack tooth engaged with the pinion in the output end of the motor 5 can be structured integrally with a rack tooth 14 provided for engaging the intermediate gear 15 by extending a forming region of the rack tooth 14. Further, a means for converting the rotation of the motor 5 into the movement in the direction of the axial length of the rack shaft 1 is not limited to the rack and pinion type motion converting mechanism, but can be structured by employing the other types of motion converting mechanisms such as a ball screw type and the like.

The motor 5 for assisting the steering attached as mentioned above is driven in accordance with a control command given to a drive circuit from an assist control portion 6 shown in FIG. 1. The assist control portion 6 is provided with a CPU, a ROM and a RAM, and is structured as an ECU executing the following control operations on the basis of an operation of the CPU in accordance with a control program stored in the ROM. The torque detection value T determined as mentioned above in the torque detection apparatus 4 is given to the assist control portion 6, a detected value of a drive current of the motor 6 is given from a motor current sensor 50 attached to the motor 5 for assisting the steering, and a detection result of a traveling state affecting the steering such as a vehicle speed, a yaw rate or the like is given from traveling state sensors 60 provided in respective portions of the vehicle.

Figure 3:
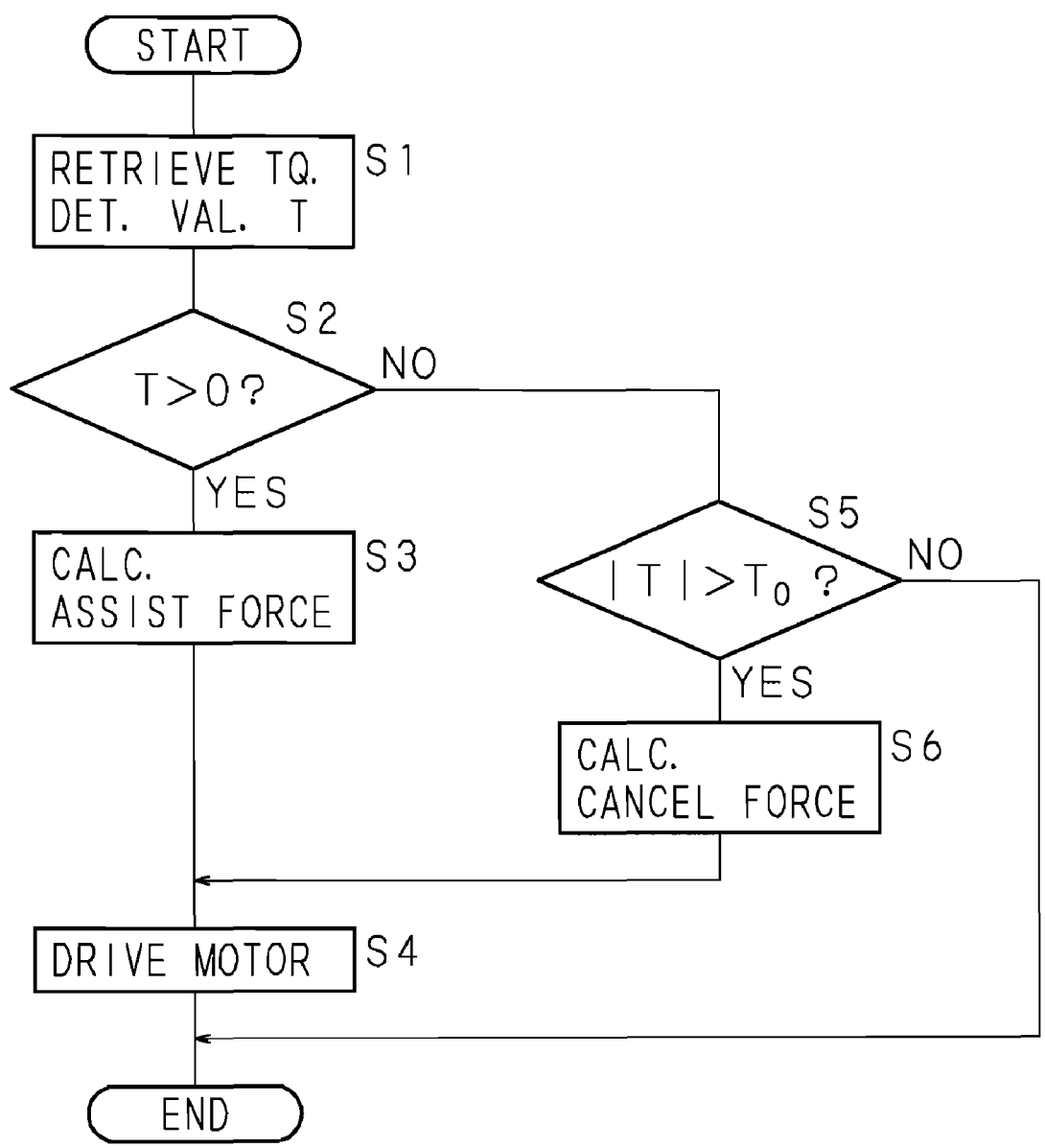
FIG. 3 is a flow chart showing contents of a control operation of an assist control portion.

FIG. 3 is a flow chart showing contents of the control operation of the assist control portion 6. The control operation is constituted, for example, by an operation which is repeatedly executed at every predetermined timing during a period that a power supply is executed in correspondence to an on operation of a key switch. The assist control portion 6 first retrieves the loaded torque detection value T given from the torque detection apparatus 4 (a step 1), and determines whether the loaded torque detection T is positive or negative (a step 2).

The torque detection value T given from the torque detection apparatus 4 is given as a positive value at a time when the normal input is applied, and as a negative value at a time when the inverse input is applied, respectively on the basis of the computation mentioned above in the torque calculating unit 40 using the outputs of the first and second force sensors 41 and 42. The step 2 corresponds to a step for discriminating whether the loaded torque detection value T is caused by the normal input or by the inverse input. In the case that the torque detection value T is determined in the step 2 as the positive value (YES in the step 2), the assist control portion 6 discriminates that the torque detection is executed by the normal input in correspondence to the operation of the steering wheel 30, applies the loaded torque detection value T to an assisting force map stored in the ROM, calculates a steering assisting force to be generated in the motor 5 for assisting the steering (a step 3), outputs an operation command to the motor 5 for assisting the steering for the purpose of generating the steering assisting force, assist drives the motor 5 (a step 4) and finishes a series of control operations.

The assist drive is executed in accordance with a feedback control using the detected value of the driving current given from the current sensor 50 for supplying the driving current corresponding to the target assisting force calculated by the step 3 to the motor 5, the steering assisting force generated by the motor 5 is applied to the rack shaft 1 on the basis of this driving, and it is possible to assist the steering as mentioned above. The assisting force map used for calculating the target assisting force in the step 3 is set per the traveling state affecting the steering such as the vehicle speed, the yaw rate or the like, and the assist control portion 7 selects the assisting force map in correspondence to the traveling state detected by the traveling state sensor 60, and calculates the target assisting force by using the assisting force map. Accordingly, it is possible to execute the proper steering assist in correspondence to the traveling state.

On the other hand, in the case that it is determined in the step 2 that the torque detection value T is the negative value (NO in the step 2), the assist control portion 6 determines that the torque detection is executed by the inverse input, and compares an absolute value of the torque detection value T with a previously set reference value T0 (a step 5). As a result of the comparison, in the case that the torque detection value T is more than the reference value T0 (YES in the step 5), the step calculates a canceling force necessary for appropriately canceling the torque detection value T (a step 6), goes to the step 4, and finishes a series of control operation by driving the motor 5 for assisting the steering for generating the calculated canceling force. In the case that the torque detection value T is equal to or less than the reference value T0 (NO in the step 5), the step finishes the series of control operation without driving the motor 5.

In the power steering apparatus of the embodiment, it is possible to determine whether the torque detection value T generated by the torque detection apparatus 4 structured as mentioned above is caused by the normal input or the inverse input. In the case that the torque detection value T caused by the inverse input is given, since the assist control portion 6 executes the operation for driving the motor 5 only at a time when the torque detection value T is more than the reference value T0, the assist control portion 6 applies the inverse input from which the excessive force corresponding to the reference value T0 is excluded, to the steering wheel 30 serving as the steering member. Accordingly, the driver operating the steering wheel 30 can execute the steering under an improved steering feeling while accurately feeling the state of the road surface.

In this case, since the torque detection value T given as the negative value includes the force component applied to the rack shaft 1 on the basis of the driving of the motor 5 for assisting the steering, it is desirable to use the torque detection value T from which a low frequency component is removed, for excluding the force component generated by the motor 5, in the comparison in the step 5. The removal of the low frequency component as mentioned above can be achieved by filter processing the outputs of the first and second force sensors 41 and 42 given to the torque calculating unit 40 of the torque detection apparatus 4, by a high pass filter.

Further, since the torque detection apparatus 4 structured as mentioned above is not provided with the torsion bar generating the torsion on the basis of the application of the steering torque, the detection of the steering torque corresponding to the normal input is executed without generating the response delay caused by the torsion of the torsion bar, and it is possible to cancel the delay of the steering assisting force at a time of starting the steering or at a time of the turn-back steering, thereby making the driver operating the steering wheel 30 feel an improved steering feeling.

As this description may be embodied in several forms without departing from the spirit of essential characteristics thereof, the present embodiment is therefore illustrative and not restrictive, since the scope of the description is defined by the appended claims rather than by description preceding them, and all changes that fall within metes and bounds of the claims, or equivalence of such metes and bounds thereof are therefore intended to be embraced by the claims.

What is claimed is:

1. A power steering apparatus equipped in a vehicle provided with a rack and pinion type steering mechanism converting a rotation of a pinion shaft in response to an operation of a steering member into a displacement in an axial direction of a rack shaft to execute steering, comprising:
    a torque detector;
    a steering actuator operating based on a torque detected by said torque detector and applying a steering assisting force to said rack shaft; and
    an intermediate gear supported by a support shaft that is substantially orthogonal to each of said pinion shaft and said rack shaft, an outer peripheral surface of said intermediate gear engaging with a pinion provided in said pinion shaft and rack teeth provided in said rack shaft, and transmitting the rotation of said pinion shaft to said rack shaft,
    wherein said pinion shaft is a rod-shaped shaft, and
    wherein said torque detector includes:
        a first force sensor directly attached to the pinion shaft, detecting a force applied to said pinion shaft;
        a second force sensor directly attached to the support shaft, detecting a force applied to said support shaft of said intermediate gear; and
        a torque calculating unit calculating said torque detected by said torque detector detecting a steering torque applied by said steering member, based on a difference of the forces detected by said first force sensor and the second force sensor.

2. A power steering apparatus according to claim 1, further comprising an assist control unit accepting said torque as an input, and outputting a control signal to said steering actuator for allowing said steering actuator to generate said steering assisting force based on the accepted torque,
    wherein said calculating unit calculates said torque in accordance with a value obtained by subtracting the force detected by said second force sensor from the force detected by said first force sensor, and outputs the calculated torque to said assist control unit, and
    wherein said assist control unit determines whether or not the accepted torque is positive, and
    wherein, when a determination result is affirmative, said assist control unit outputs said control signal corresponding to said steering assisting force based on said torque, to said steering actuator, so as to apply a positive feedback to the operation of said steering member.

3. A power steering apparatus according to claim 2,
    wherein, when said determination result is negative, said assist control unit further determines whether or not an absolute value of said torque is larger than a predetermined value, and,
    wherein, when a further determination result is affirmative, said assist control unit calculates a canceling force to at least partly cancel the operation of said steering member based on said torque, and outputs said control signal corresponding to the calculated canceling force as a negative steering assisting force, to said steering actuator.

4. A power steering apparatus as claimed in claim 2, wherein the forces of said first and second force sensors are filter processed by a high pass filter.

5. A power steering apparatus as claimed in claim 1, wherein said pinion shaft is substantially perpendicular to said rack shaft.

* * * * *